UNITED STATES PATENT OFFICE.

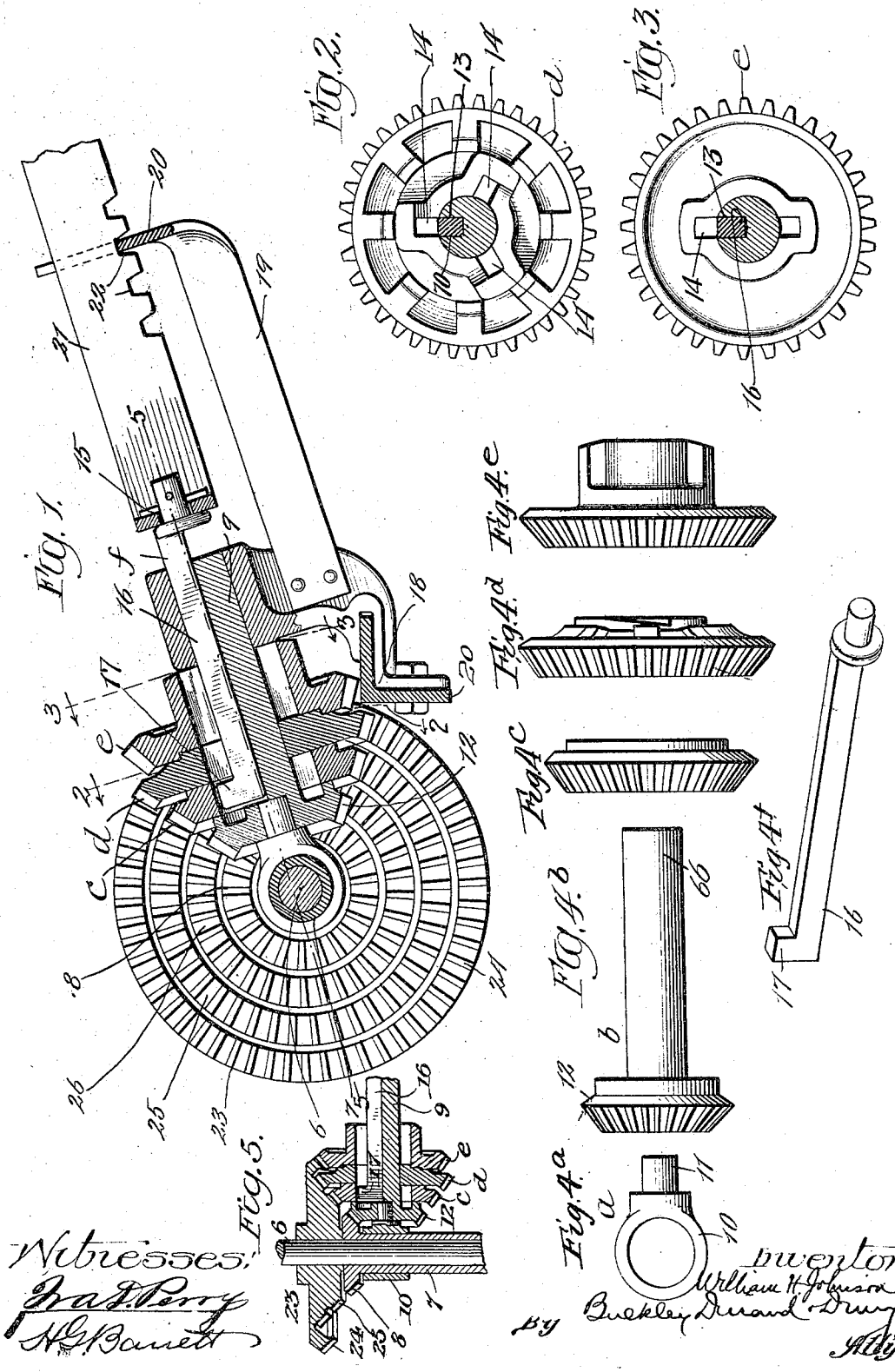

WILLIAM H. JOHNSON, OF ROCK ISLAND, ILLINOIS, ASSIGNOR TO ROCK ISLAND PLOW COMPANY, OF ROCK ISLAND, ILLINOIS, A CORPORATION OF ILLINOIS.

VARIABLE-SPEED MECHANISM.

1,045,151.  Specification of Letters Patent.  Patented Nov. 26, 1912.

Application filed January 14, 1909. Serial No. 472,547.

*To all whom it may concern:*

Be it known that I, WILLIAM H. JOHNSON, a citizen of the United States of America, and resident of Rock Island, Illinois, have invented a certain new and useful Improvement in Variable-Speed Mechanism, of which the following is a specification.

My invention relates to improvements in variable speed mechanism, and has for its object the production of a device by the use of which any desired pairs of variable gears may be locked in operative position without stopping the movement of the machine by which said gears are operated.

A further object is the production of a variable speed, power-transmitting device in which the speed may be varied in any predetermined degree by simply shifting a single element of the device.

A further object is the production of a device that may be readily adapted for use in any situation in which a speed-changing device is desired.

A further object is the production of a device that can be cheaply constructed, and one that is not liable to disarrangement of parts.

These and such other objects as may hereinafter appear are attained by my device, an embodiment of which is illustrated in the accompanying drawings, in which—

Figure 1 represents a plan view of my device in position, one set of gears being shown in section. Fig. 2 represents a sectional view on line 2—2 of Fig. 1, looking in the direction indicated by the arrows. Fig. 3 represents a sectional view on the line 3—3 of Fig. 1, looking in the direction indicated by the arrows. Fig. 4$^a$ represents a side elevation of the collar. Fig. 4$^b$ represents a side elevation of the countershaft. Figs. 4$^c$, 4$^d$ and 4$^e$ represent each a side elevation of a bevel gear. Fig. 4$^f$ represents a side elevation of the key. Fig. 5 is a sectional view taken on line 5—5 of Fig. 1.

Like numerals of reference indicate like parts in the several figures of the drawings.

Referring now to the drawings—6 represents a driven shaft, 7 a power-transmission sleeve loosely surrounding the shaft on one end of which is cast or rigidly secured a bevel gear 8. A collar 10 is mounted on the sleeve 7, upon which collar is mounted the bevel gear 12. Integrally secured to this bevel gear there is a counter shaft 9. A plurality of bevel gears or pinions $c$, $d$, $e$, are loosely journaled on the counter shaft. The counter shaft is provided with a longitudinal slot or groove 13 and the inner periphery of the bevel gears are also provided with a plurality of slots 14. A key or locking member 15, comprising a straight shank 16 and an offset or lug 17 at its lower end, is adapted to slide within the slot 13, the offset or lug 17 passing within the slots or grooves 14. The counter shaft may be supported on the frame of a machine at 18 and the key support 19 extends parallel with the counter shaft and is provided with a rest or latch 20 through which the upper end or handle 21 of the key passes. The handle is preferably notched at 22 by means of which the key may be held in any desired position; that is, locking any desired bevel gear on the counter shaft. On the end of the shaft 6 is rigidly mounted a multiple bevel gear wheel 23, shown in this instance with three gears, 24, 25 and 26, having varying numbers of teeth, and set to mesh with gears $e$, $d$, $c$, the gears 8 and 12 also being in mesh. If the loose gears on the counter shaft are, for instance, formed with eighteen teeth, the gears 24, 25 and 26 may be provided with thirty-six, twenty-four and eighteen teeth, giving one-half, three quarters or a full revolution of the shaft 6 to each revolution of the sleeve.

It will, therefore, be seen that I have produced a variable speed gearing and simple means for locking the parts in operative position. I do not, however, limit its use to any particular machine, as it is evident that my improved gearing and shifting key is capable of use in any machine in which a variable gearing is required, and the shifting key makes it possible to change the speed at any time and in any desired manner—subject, of course, only to the limitations imposed by the gearing—without stopping the machine. This is readily accomplished by the multiplication of the radial slots 14 extending radially from the inner periphery of the gears, making it unnecessary to wait for entire revolutions of the gears before shifting the key.

I am aware that devices of this character are in use in which a multiplicity of spring-actuated keys are employed, together with means for depressing these keys and drawing them toward or away from the slots or key-ways in the different pinions, but in my device the simple shifting key *f* with an upturned end 17 is a new and novel means of accomplishing the same result.

I have also shown a simple and effective method of locking the key in any desired position on the rest 20 of the support. Other means of locking the key in position may be utilized without departing from the spirit of my invention.

I claim:

1. In a machine, the combination of a variable gearing comprising a shaft, a multiple gear rigidly mounted thereon, a sleeve loosely mounted on said shaft, a gear rigidly mounted on the end of said sleeve, a slotted counter shaft carried by said sleeve and extending at an angle thereto, a gear rigid on said counter shaft and meshing with the gear on said sleeve, a plurality of slotted gears loosely mounted on said counter shaft and meshing with the multiple gear, a key sliding within the slot in said counter shaft and adapted to lock any desired gear rigidly on said counter shaft, and means for locking said key in any desired position.

2. In a machine, the combination of a variable gearing comprising a shaft, a multiple gear rigidly mounted thereon, a sleeve loosely mounted on said shaft, a gear rigidly mounted on the end of said sleeve, a slotted counter shaft carried by said sleeve and extending at an angle thereto, a gear rigid on said counter shaft and meshing with the gear on said sleeve, a plurality of slotted gears loosely mounted on said counter shaft and meshing with the multiple gear, a key provided with a notched handle sliding within the slot in said counter shaft and adapted to lock any desired gear rigidly on said counter shaft, and means for locking said key in any desired position, comprising a latch mounted on the frame and adapted to engage the notches in said handle.

3. In a machine, the combination of a variable gearing comprising a shaft, a multiple gear rigidly mounted thereon, a sleeve loosely mounted on said shaft, a gear rigidly mounted on the end of said sleeve, a counter shaft, a collar loosely mounted on said sleeve and provided with means for engaging said counter shaft, a gear rigid on said counter shaft and meshing with the gear on said sleeve, a plurality of slotted gears loosely mounted on said counter shaft and meshing with the multiple gear, a key sliding within the slot in said counter shaft and adapted to lock any desired gear rigidly on said counter shaft, and means for locking said key in any desired position.

4. In a machine, the combination of a variable gearing comprising a shaft, a multiple bevel gear rigidly mounted thereon, a sleeve loosely mounted on said shaft, a bevel gear rigidly mounted on the end of said sleeve, a counter shaft extending at an angle to said first-mentioned shaft, a collar loosely mounted on said sleeve and provided with means for engaging said counter shaft, a bevel gear rigid on said counter shaft and meshing with the bevel gear on said sleeve, a plurality of slotted bevel gears loosely mounted on said counter shaft and meshing with the multiple bevel gear, and a key sliding within the slots in said counter shaft and adapted to lock any desired gear rigidly on said counter shaft.

Signed by me at Rock Island, Ill., this 11th day of Dec. 1908.

WILLIAM H. JOHNSON.

Witnesses:
A. B. FRENIER,
H. DETJENS.

Copies of this patent may be obtained for five cents each, by addressing the "Commissioner of Patents, Washington, D. C."